(12) United States Patent
Padhy et al.

(10) Patent No.: US 12,184,493 B1
(45) Date of Patent: Dec. 31, 2024

(54) ROLLBACK-ON-ERROR SUPPORT FOR FORWARDING COMPONENTS OF A NETWORK DEVICE

(71) Applicant: Juniper Networks, Inc., Sunnyvale, CA (US)

(72) Inventors: Ashok Kumar Padhy, Westford, MA (US); Scott Mackie, Santa Cruz, CA (US); Sreenivas Gadela, Santa Clara, CA (US); Swamy Sadashivaiah Renu Kananda, Tracy, CA (US); Yanfang Zhang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/473,469

(22) Filed: Sep. 25, 2023

(51) Int. Cl.
| | |
|---|---|
| *G06F 15/177* | (2006.01) |
| *H04L 41/082* | (2022.01) |
| *H04L 41/0859* | (2022.01) |
| *H04L 41/0866* | (2022.01) |

(52) U.S. Cl.
CPC ........ *H04L 41/0866* (2013.01); *H04L 41/082* (2013.01); *H04L 41/0863* (2013.01)

(58) Field of Classification Search
CPC .............. H04L 41/0866; H04L 41/082; H04L 41/0863
USPC .......................................................... 709/220
See application file for complete search history.

(56) References Cited

U.S. PATENT DOCUMENTS

| | | | | |
|---|---|---|---|---|
| 7,010,617 | B2 * | 3/2006 | Kampe | ................. H04L 41/082 709/248 |
| 7,496,893 | B2 * | 2/2009 | Mohindra | ................. G06F 8/61 709/224 |
| 8,191,043 | B2 * | 5/2012 | Mohindra | ............. G06F 9/5038 717/121 |
| 9,183,092 | B1 * | 11/2015 | Marr | .................... G06F 11/1417 |
| 9,887,878 | B2 * | 2/2018 | Mahajan | ................. H04L 67/12 |
| 9,904,614 | B2 | 2/2018 | Stevens et al. | |
| 10,666,507 | B2 * | 5/2020 | Lahiri | .................... G06F 11/142 |
| 10,771,332 | B2 * | 9/2020 | Mahajan | ............. H04L 41/0813 |
| 11,140,029 | B1 * | 10/2021 | Singhal | ............... H04L 41/0893 |
| 11,144,438 | B1 * | 10/2021 | Teixeira | ................. G06F 8/658 |
| 11,151,024 | B2 * | 10/2021 | Hwang | ............... G06F 11/3024 |

(Continued)

FOREIGN PATENT DOCUMENTS

WO      2020/069647 A1      4/2020

*Primary Examiner* — Alicia Baturay
(74) *Attorney, Agent, or Firm* — Harrity & Harrity, LLP

(57) ABSTRACT

A network device may receive an original configuration that includes configuration objects, and may generate, based on the original configuration, a dependency graph that includes nodes representing and entries representing the configuration objects. The network device may receive a configuration update that includes new configuration objects, and may update the dependency graph based on the configuration update and to generate an updated dependency graph that includes new nodes and/or new entries representing the new configuration objects. The network device may test the configuration update, based on the updated dependency graph, to determine whether the configuration update fails or succeeds. The network device may selectively implement the configuration update based on the configuration update succeeding or perform a rollback of the configuration update, based on the configuration update failing, to restore the original configuration.

20 Claims, 13 Drawing Sheets

(56) References Cited

U.S. PATENT DOCUMENTS

| | | | | |
|---|---|---|---|---|
| 11,153,163 B1* | 10/2021 | Singhal | .................. | G06F 11/004 |
| 11,223,516 B1* | 1/2022 | Singhal | .................. | H04L 41/082 |
| 11,290,328 B1* | 3/2022 | Singhal | ................... | H04L 67/10 |
| 11,290,330 B1* | 3/2022 | Kothuri | ................. | H04L 41/082 |
| 11,316,775 B2* | 4/2022 | Katz | ..................... | G06F 9/5061 |
| 11,374,807 B2* | 6/2022 | Kothuri | ............... | H04L 41/0813 |
| 11,374,814 B2* | 6/2022 | Gupta | ................... | H04L 41/082 |
| 11,481,269 B2* | 10/2022 | Muramatti | ........... | H04L 41/0816 |
| 11,625,231 B2* | 4/2023 | Padubidri | ................. | G06F 8/65 |
| | | | | 717/170 |
| 11,700,178 B2* | 7/2023 | Kothuri | ............... | H04L 41/0654 |
| | | | | 709/220 |
| 11,734,100 B2* | 8/2023 | Singhal | .............. | H04L 41/0893 |
| | | | | 709/221 |
| 11,770,331 B1* | 9/2023 | Kompella | ............... | H04L 45/50 |
| | | | | 370/389 |
| 11,870,646 B2* | 1/2024 | Siddabathuni | ....... | H04L 43/0805 |
| 11,971,814 B2* | 4/2024 | Moyal | ................. | G06F 11/3692 |
| 12,013,834 B1* | 6/2024 | Chen | ................... | G06F 16/2322 |
| 2009/0037601 A1* | 2/2009 | Jain | ......................... | H04L 12/66 |
| | | | | 709/242 |
| 2021/0397426 A1* | 12/2021 | Du | ............................ | G06F 8/61 |
| 2022/0091883 A1* | 3/2022 | Gadre | ................. | G06N 20/00 |
| 2023/0168992 A1* | 6/2023 | Koch | ................. | H04L 41/5009 |
| | | | | 717/124 |
| 2023/0315862 A1* | 10/2023 | Abadi | ................. | G06F 9/44521 |
| | | | | 726/25 |

\* cited by examiner

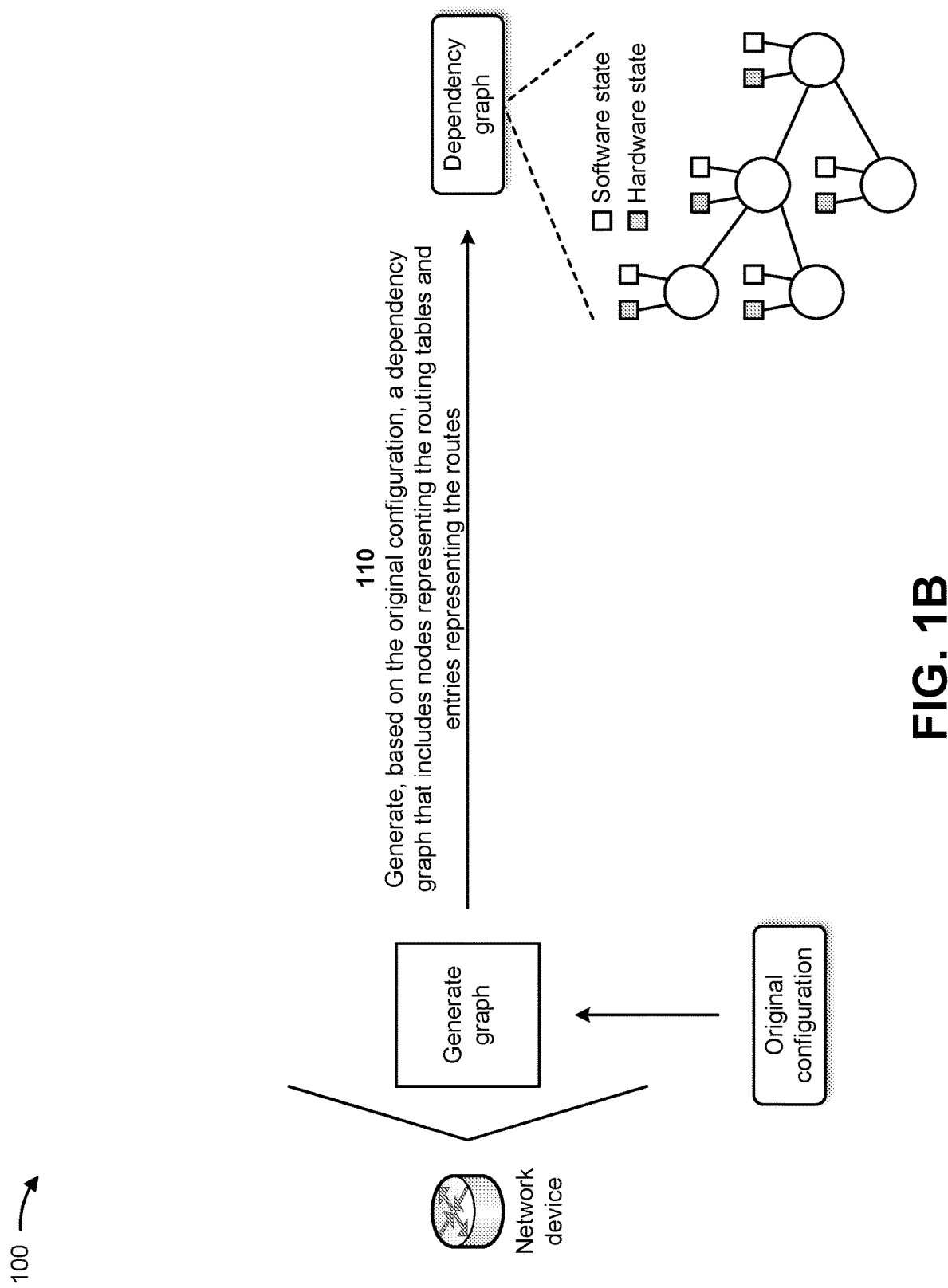

ROLLBACK-ON-ERROR SUPPORT FOR FORWARDING COMPONENTS OF A NETWORK DEVICE

BACKGROUND

A network device may include hardware, such as packet forwarding components (e.g., packet forwarding engines (PFEs)). Each packet forwarding component may utilize software (e.g., routing tables, routes, and/or the like) to control forwarding of packets by the packet forwarding component.

SUMMARY

Some implementations described herein relate to a method. The method may include receiving an original configuration that includes configuration objects, and generating, based on the original configuration, a dependency graph that includes nodes and entries representing the configuration objects. The method may include receiving a configuration update that includes one or more new configuration objects, and updating the dependency graph based on the configuration update and to generate an updated dependency graph that includes one or more new nodes or one or more new entries representing the configuration objects. The method may include testing the configuration update, based on the updated dependency graph, to determine whether the configuration update fails or succeeds. The method may include selectively implementing the configuration update based on the configuration update succeeding, or performing a rollback of the configuration update, based on the updated dependency graph and based on the configuration update failing, to restore the original configuration.

Some implementations described herein relate to a network device. The network device may include one or more memories and one or more processors coupled to the one or more memories. The one or more processors may be configured to receive an original configuration that includes configuration objects, and generate, based on the original configuration, a dependency graph that includes nodes and entries representing the configuration objects, wherein the dependency graph is a representation of a packet topology. The one or more processors may be configured to receive a configuration update that includes one or more new configuration objects, and update the dependency graph based on the configuration update and to generate an updated dependency graph that includes one or more new nodes and one or more new entries representing the configuration objects. The one or more processors may be configured to test the configuration update, based on the updated dependency graph, to determine whether the configuration update fails or succeeds. The one or more processors may be configured to selectively implement the configuration update based on the configuration update succeeding, or perform a rollback of the configuration update, based on the updated dependency graph and based on the configuration update failing, to restore the original configuration.

Some implementations described herein relate to a non-transitory computer-readable medium that stores a set of instructions. The set of instructions, when executed by one or more processors of a network device, may cause the network device to receive an original configuration that includes configuration objects, and generate, based on the original configuration, a dependency graph that includes nodes and entries representing the configuration objects. The set of instructions, when executed by one or more processors of the network device, may cause the network device to receive a configuration update that includes one or more new configuration objects, wherein the original configuration and the configuration update are associated with a packet forwarding component of the network device. The set of instructions, when executed by one or more processors of the network device, may cause the network device to update the dependency graph based on the configuration update and to generate an updated dependency graph that includes one or more new nodes or one or more new entries representing the configuration objects. The set of instructions, when executed by one or more processors of the network device, may cause the network device to test the configuration update, based on the updated dependency graph, to determine whether the configuration update fails or succeeds. The set of instructions, when executed by one or more processors of the network device, may cause the network device to selectively implement the configuration update based on the configuration update succeeding, or perform a rollback of the configuration update, based on the updated dependency graph and based on the configuration update failing, to restore the original configuration.

BRIEF DESCRIPTION OF THE DRAWINGS

FIGS. 1A-1I are diagrams of an example associated with rollback-on-error support for forwarding components of a network device.

DETAILED DESCRIPTION

Figure 1A:
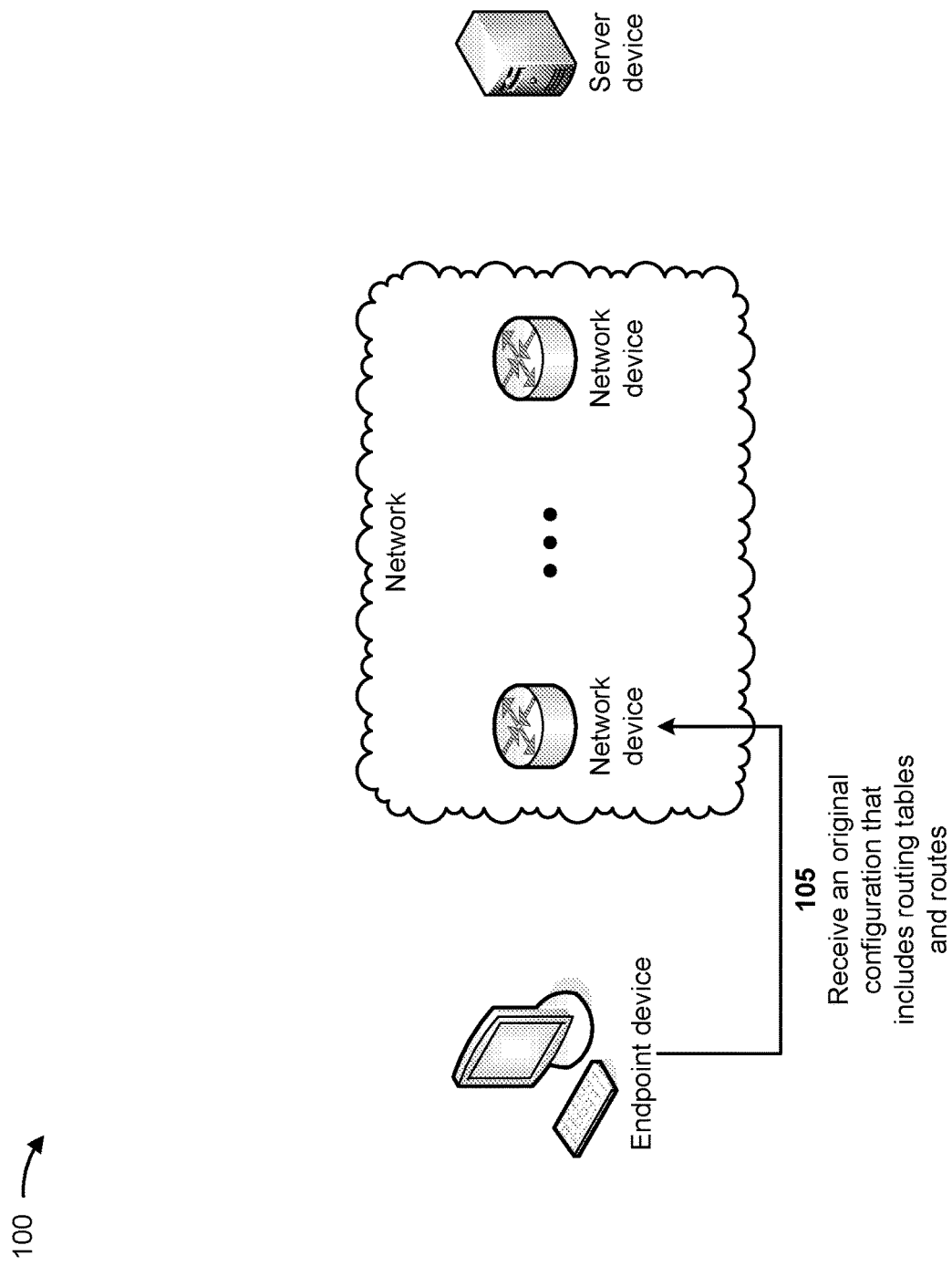

The following detailed description of example implementations refers to the accompanying drawings. The same reference numbers in different drawings may identify the same or similar elements.

A network device may require a configuration update and various types of errors may occur due to the configuration update. For example, the configuration update may cause hardware resource exhaustion in the network device, the configuration update may not be supported by the network device, the configuration update may include bugs, the configuration update may cause system level errors (e.g., memory exhaustion, socket issues, etc.), and/or the like. A configuration update error may be handled by logging the configuration update error, incrementing an error counter for the configuration update error, displaying the configuration update error in a command line interface (CLI) of the network device, reporting the configuration update error via telemetry, and/or the like. There are various techniques for correcting a configuration update error that are context specific or application specific. If the configuration update error is not corrected, hardware and/or software of the network device may enter an inconsistent state that results in dropped traffic. For example, a software state of a packet forwarding engine (PFE) of the network device may need to be reverted to a working state when a configuration update error occurs.

Thus, current techniques for correcting a configuration update error in a network device consume computing resources (e.g., processing resources, memory resources, communication resources, and/or the like), networking resources, and/or the like, associated with creating an inconsistent state in the network device, handling lost traffic due the inconsistent state in the network device, exhausting resources of the network device for context specific or application specific techniques to correct the configuration update error, and/or the like.

Some implementations described herein relate to a network device that provides rollback-on-error support for forwarding components of the network device. For example, the network device may receive an original configuration that includes configuration objects, and may generate, based on the original configuration, a dependency graph that includes nodes representing and entries representing the configuration objects. The network device may receive a configuration update that includes new configuration objects, and may update the dependency graph based on the configuration update and to generate an updated dependency graph that includes new nodes representing and/or new entries representing the configuration objects. The network device may test the configuration update, based on the updated dependency graph, to determine whether the configuration update fails or succeeds. The network device may selectively implement the configuration update based on the configuration update succeeding or perform a rollback of the configuration update, based on the updated dependency graph and based on the configuration update failing, to restore the original configuration.

In this way, the network device provides rollback-on-error support for forwarding components of the network device. For example, the network device may provide a methodology to revert a configuration of the network device to an original state when a configuration update error occurs. The network device may test the configuration update and may determine whether a configuration update error occurs based on testing the configuration update. If a configuration update error occurs, the network device may rollback the configuration of the network device to an original state prior to the configuration update. Thus, the network device conserves computing resources, networking resources, and/or the like that would otherwise have been consumed based on creating an inconsistent state in the network device, handling lost traffic due the inconsistent state in the network device, exhausting resources of the network device for context specific or application specific techniques to correct the configuration update error, and/or the like.

FIGS. 1A-1I are diagrams of an example 100 associated with rollback-on-error support for forwarding components of a network device. As shown in FIGS. 1A-1I, example 100 includes an endpoint device and a server device associated with a network of network devices. Further details of the endpoint device, the server device, the network, and the network devices are provided elsewhere herein.

As shown in FIG. 1A, and by reference number 105, the network device may receive an original configuration that includes configuration objects (e.g., routing tables and routes). For example, the network device may include hardware, such as packet forwarding components (e.g., PFEs). Each packet forwarding component may utilize a configuration (e.g., that includes routing tables, routes, next hops, firewalls, interfaces, and/or the like) to control forwarding of packets by the packet forwarding component. In some implementations, a user (e.g., a network administrator) may utilize the endpoint device to generate the original configuration that includes the routing tables and the routes (e.g., or other configuration objects, such as next hops, firewalls, interfaces, and/or the like), and may cause the endpoint device to provide the original configuration that includes the routing tables and the routes to the network device. The network device may receive the original configuration that includes the routing tables and the routes from the endpoint device. In some implementations, the network device may be preprogrammed with the original configuration that includes the routing tables and the routes, the user may utilize a command line interface of the network device to provide the original configuration that includes the routing tables and the routes to the network device, and/or the like. In some implementations, the original configuration may be associated with a packet forwarding component of the network device. The packet forwarding component may utilize the routing tables of the original configuration to define routes for packets processed by the packet forwarding component.

As shown in FIG. 1B, and by reference number 110, the network device may generate, based on the original configuration, a dependency graph that includes nodes and entries representing the configuration objects (e.g., nodes representing the routing tables and entries representing the routes). For example, the network device may create nodes for the routing tables (e.g., or other configuration objects, such as next hops, firewalls, interfaces, and/or the like) of the original configuration and may create entries for the routes (e.g., or other configuration objects, such as next hops, firewalls, interfaces, and/or the like) of the original configuration. The network device may determine dependencies between the routing tables and/or the routes (e.g., or other configuration objects, such as next hops, firewalls, interfaces, and/or the like), and may interconnect the nodes and/or the entries based on the determined dependencies between the routing tables and/or the routes (e.g., or other configuration objects, such as next hops, firewalls, interfaces, and/or the like) to generate the dependency graph. In some implementations, each node or entry (e.g., represented by a circle in the dependency graph) may be associated with a software state (e.g., represented by an unshaded square in the dependency graph) and/or a hardware state (e.g., represented by a shaded square in the dependency graph). In some implementations, the dependency graph may define a packet topology (e.g., destinations, routes, and/or the like) associated with packets processed by the packet forwarding component of the network device.

Figure 1C:
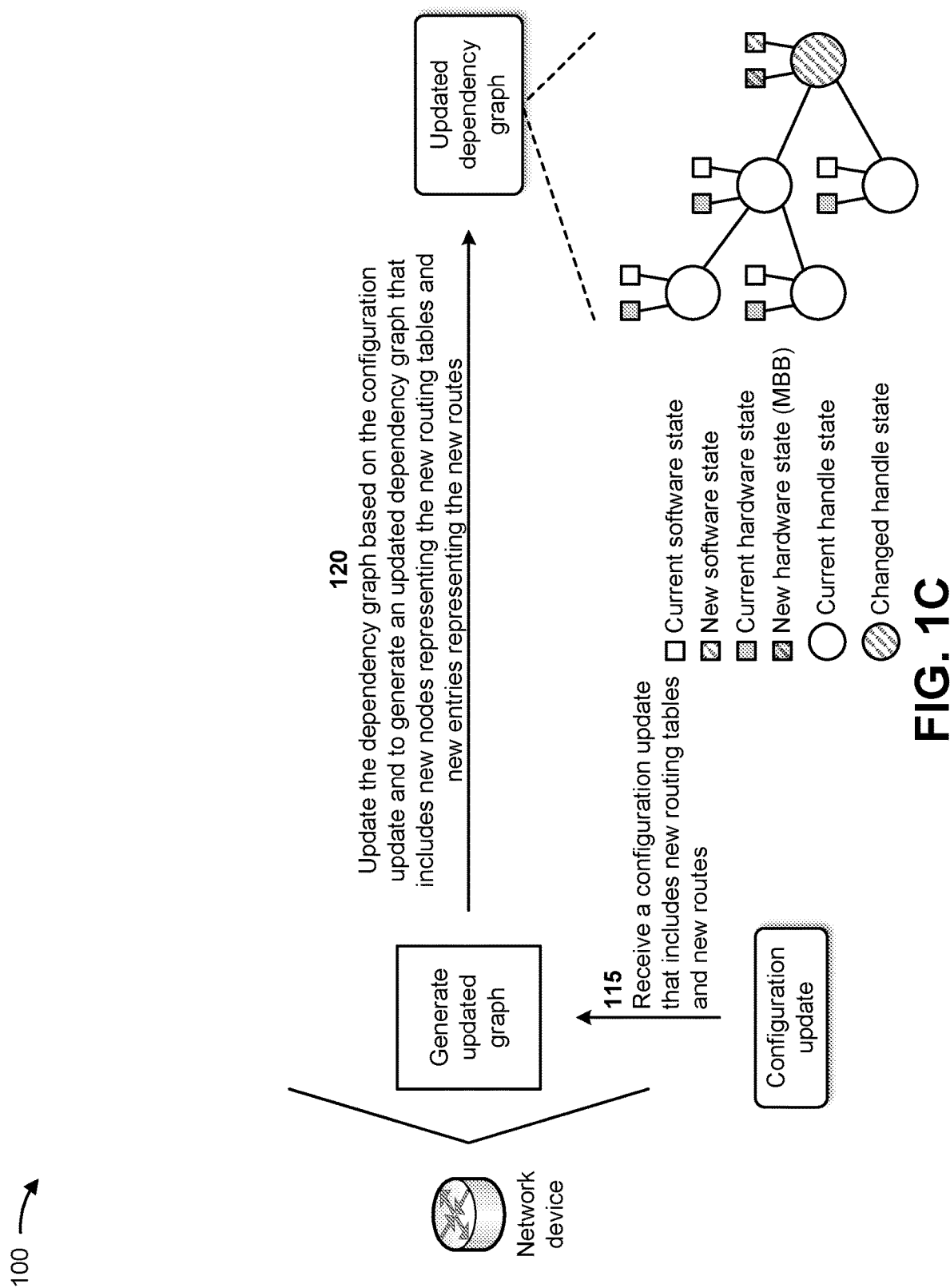

As shown in FIG. 1C, and by reference number 115, the network device may receive a configuration update that includes new configuration objects (e.g., new routing tables and new routes). For example, the network device may require a configuration update that updates the original configuration. In some implementations, a user (e.g., a network administrator) may utilize the endpoint device to generate the configuration update that includes the new routing tables and the new routes, and may cause the endpoint device to provide the configuration update that includes the new routing tables and the new routes to the network device. The network device may receive the configuration update that includes the new routing tables and the new routes from the endpoint device. In some implementations, the user may utilize the command line interface of the network device to provide the configuration update that includes the new routing tables and the new routes to the network device. In some implementations, the configuration update may cause one or more routing tables and/or one or more routes to be removed from the original configuration. In some implementations, the configuration update may be associated with the packet forwarding component of the network device. The packet forwarding component may utilize the new routing tables of the configuration update to define the new routes for packets processed by the packet forwarding component.

As further shown in FIG. 1C, and by reference number 120, the network device may update the dependency graph based on the configuration update and to generate an updated dependency graph that includes new nodes and new entries representing the new configuration objects (e.g., new nodes representing the new routing tables and new entries representing the new routes). For example, the network device may create new nodes for the new routing tables of the configuration update, may modify the nodes for the routing tables of the original configuration based on the configuration update, may create new entries for the new routes of the configuration update, may modify the entries for the routes of the original configuration based on the configuration update, and/or the like. The network device may determine dependencies between the routing tables, the routes, the new routing tables, and/or the new routes and may interconnect the nodes, the entries, the new nodes, and/or the new routes based on the determined dependencies between the routing tables, the routes, the new routing tables, and/or the new routes to generate the updated dependency graph. In some implementations, each node or entry (e.g., represented by a circle in the dependency graph) may be associated with a current software state (e.g., represented by an unshaded square in the dependency graph) and/or a current hardware state (e.g., represented by a shaded square in the dependency graph). In some implementations, each new or updated node or entry (e.g., represented by a cross-hatched circle in the dependency graph) may be associated with a new software state (e.g., represented by a cross-hatched and unshaded square in the dependency graph) and/or a new hardware state (e.g., represented by a cross-hatched and shaded square in the dependency graph).

In some implementations, the updated dependency graph may define an updated packet topology (e.g., destinations, routes, and/or the like) associated with packets processed by the packet forwarding component of the network device. In some implementations, the configuration update may include one or more in-place updates (e.g., updates to a node or an entry of the dependency graph), one or more make-before-break (MBB) updates (e.g., updates to multiple nodes or entries of the dependency graph). An example of an in-place update is described below in connection with FIG. 1F. An example of an MBB update is described below in connection with FIG. 1G.

In some implementations, when updating the dependency graph based on the configuration update, the network device may update a software dependency state of the dependency graph based on the configuration update, and may update a hardware state of the dependency graph based on the configuration update to generate the updated dependency graph. In some implementations, when updating the dependency graph based on the configuration update, the network device may update a software dependency state of the dependency graph based on the configuration update and to generate an updated software dependency state, and may update a hardware state of the dependency graph based on the configuration update and to generate an updated hardware dependency state. The network device may then backpropagate the updated software dependency state and the updated hardware dependency state in the dependency graph to generate the updated dependency graph.

Figure 1D:
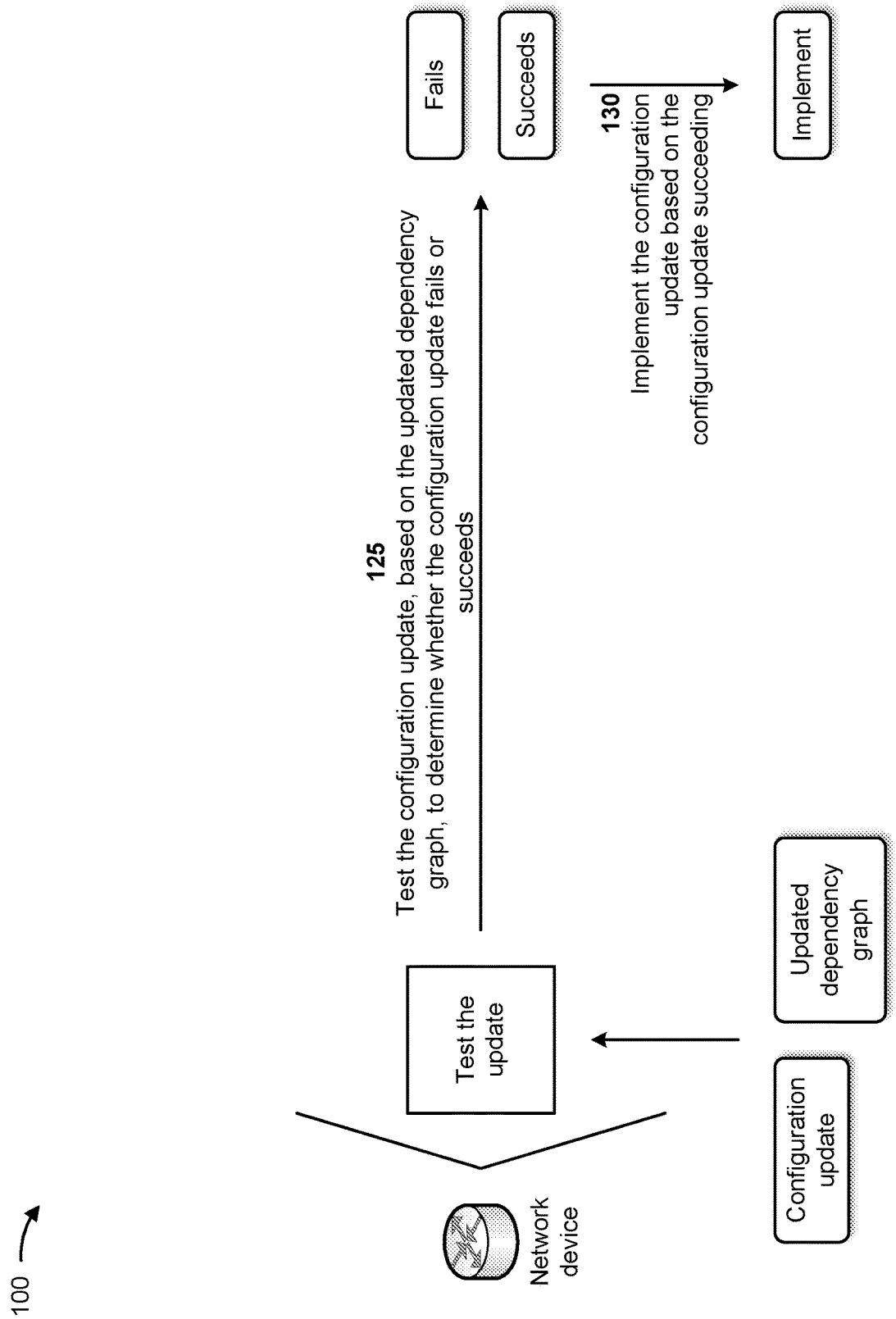

As shown in FIG. 1D, and by reference number 125, the network device may test the configuration update, based on the updated dependency graph, to determine whether the configuration update fails or succeeds. For example, various types of errors may occur due to the configuration update. In some implementations, the configuration update may cause hardware resource exhaustion in the network device, the configuration update may not be supported by the network device, the configuration update may include bugs, the configuration update may cause system level errors (e.g., memory exhaustion, socket issues, etc.), and/or the like. Thus, the network device may test the configuration update prior to implementing the configuration update in order to ensure that the configuration update does not generate errors. In some implementations, the network device may test the configuration update (e.g., perform a dry run) based on the updated dependency graph to determine whether the configuration update generates errors. In some implementations, the network device may identify one or more configuration update errors based on testing the configuration update, and may determine that the configuration update fails based on identifying the one or more configuration update errors. Alternatively, the network device may identify no configuration update errors based on testing the configuration update, and may determine that the configuration update succeeds based on identifying no configuration update errors.

As further shown in FIG. 1D, and by reference number 130, the network device may implement the configuration update based on the configuration update succeeding. For example, when the network device determines that the configuration update succeeds based on identifying no configuration update errors, the network device may implement the configuration update in the network device. The network device may utilize the configuration update to process traffic (e.g., packets) handled by the network device. In some implementations, when implementing the configuration update based on the configuration update succeeding, the network device may implement the configuration update in the packet forwarding component of the network device. In such implementations, the packet forwarding component of the network device may utilize the configuration update to process traffic (e.g., packets) handled by the packet forwarding component.

Figure 1E:
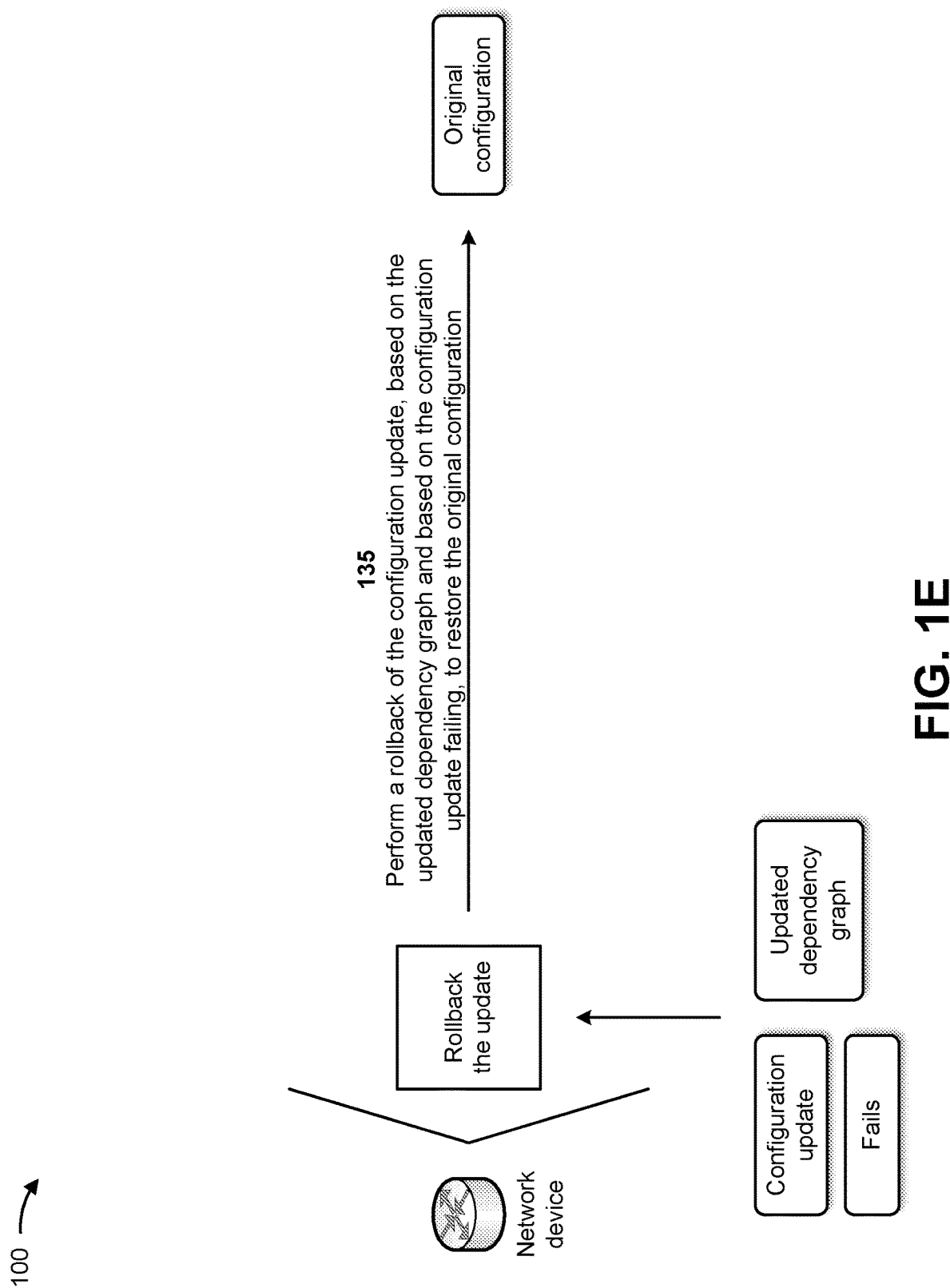

As shown in FIG. 1E, and by reference number 135, the network device may perform a rollback of the configuration update, based on the updated dependency graph and based on the configuration update failing, to restore the original configuration. For example, when the network device determines that the configuration update fails based on identifying the one or more configuration update errors, the network device may perform the rollback of the configuration update, based on the updated dependency graph, to restore the original configuration. Performing the rollback may revert the configuration (e.g., a software state) of the network device to a working state (e.g., the original configuration) when the configuration update fails.

In some implementations, when performing the rollback of the configuration update, the network device may identify, in at least one or more new nodes or at least one or more new entries of the updated dependency graph, an error that generates an invalid software state, and may revert a software state of the updated dependency graph to an original state, which may restore the original configuration. In some implementations, when performing the rollback of the configuration update, the network device may identify, in at least one or more new nodes or at least one or more new entries of the updated dependency graph, an error that generates an invalid hardware state, and may revert a hardware state of the updated dependency graph to an original state, which may restore the original configuration.

In some implementations, when performing the rollback of the configuration update, the network device may identify, in the one or more new nodes or the one or more new entries of the updated dependency graph, multiple errors that generate an invalid hardware state, and revert the one or more new nodes or the one or more new entries of the updated dependency graph associated with the multiple errors. The network device may record, in a revert stack, the reverting of the one or more new nodes or the one or more new entries of the updated dependency graph associated with the multiple errors, and may revert, based on the revert stack, a hardware state of the updated dependency graph to an original state, which may restore the original configuration. In some implementations, when performing the rollback of the configuration update, the network device may identify an error in at least one or more new nodes of the updated dependency graph and may create a place holder node for the at least one or more new nodes. The network device may release resources allocated to the at least one or more new nodes, and may revert the updated dependency graph to restore the original configuration based on creating the place holder node and based on releasing the resources allocated to the at least one or more new nodes.

Figure 1F:
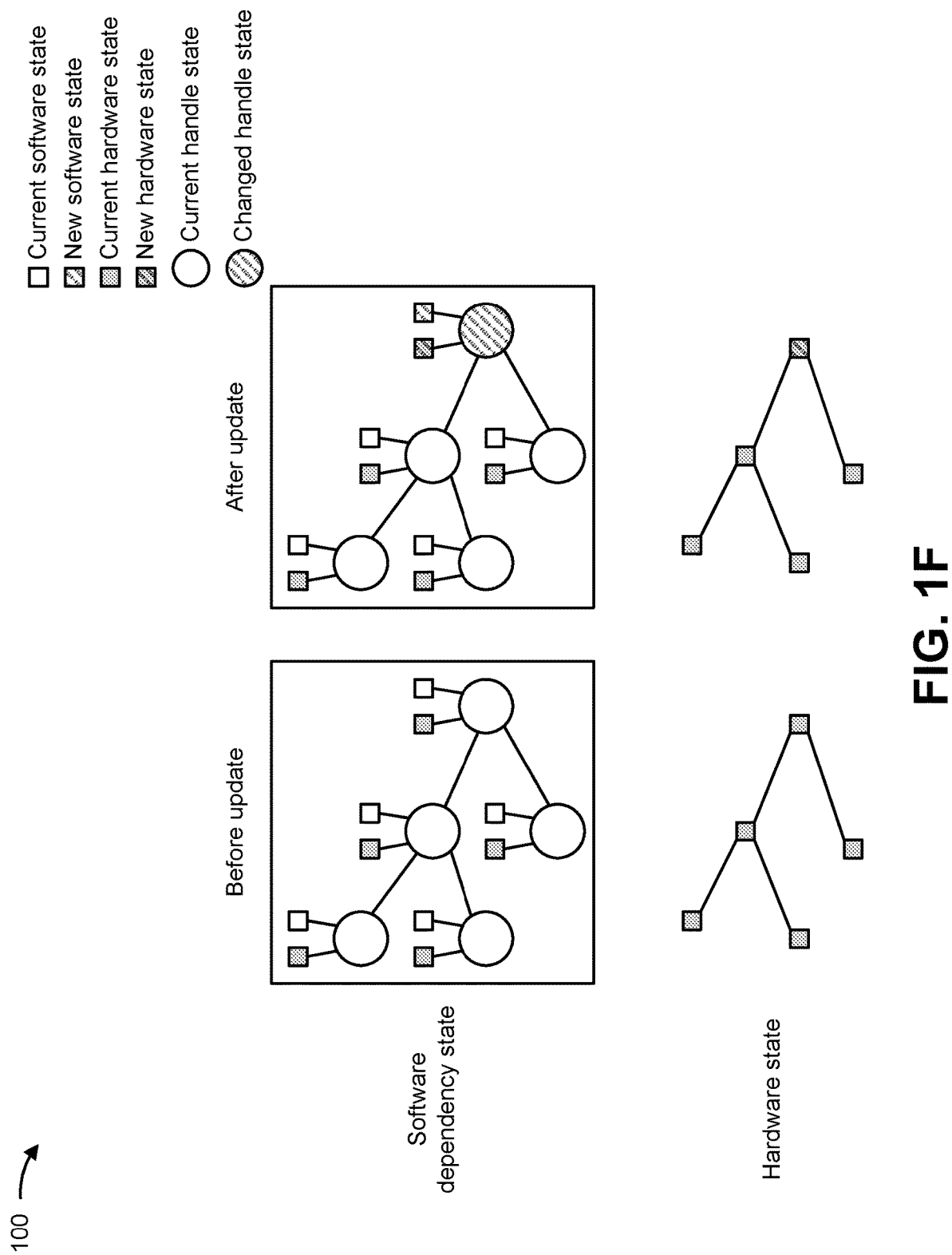

FIG. 1F depicts an example of an in-place update for the network device (e.g., via the configuration update). As shown, before the configuration update, the dependency graph shown to the left may include multiple nodes or entries (e.g., the unshaded circles) associated with a current software state (e.g., the unshaded squares) and a current hardware state (e.g., the shaded squares). Before the configuration update, the current hardware state may also be represented by a dependency graph. As further shown in FIG. 1F, after the configuration update, the updated dependency graph shown to the right may include a node or entry (e.g., the cross-hatched circle) associated with a new software state (e.g., the cross-hatched and unshaded square) and new hardware state (e.g., the cross-hatched and shaded square). The updated dependency graph may also include multiple nodes or entries (e.g., the unshaded circles) associated with the current software state (e.g., the unshaded squares) and the current hardware state (e.g., the shaded squares). After the configuration update, the new hardware state may also be represented by a dependency graph.

Figure 1G:
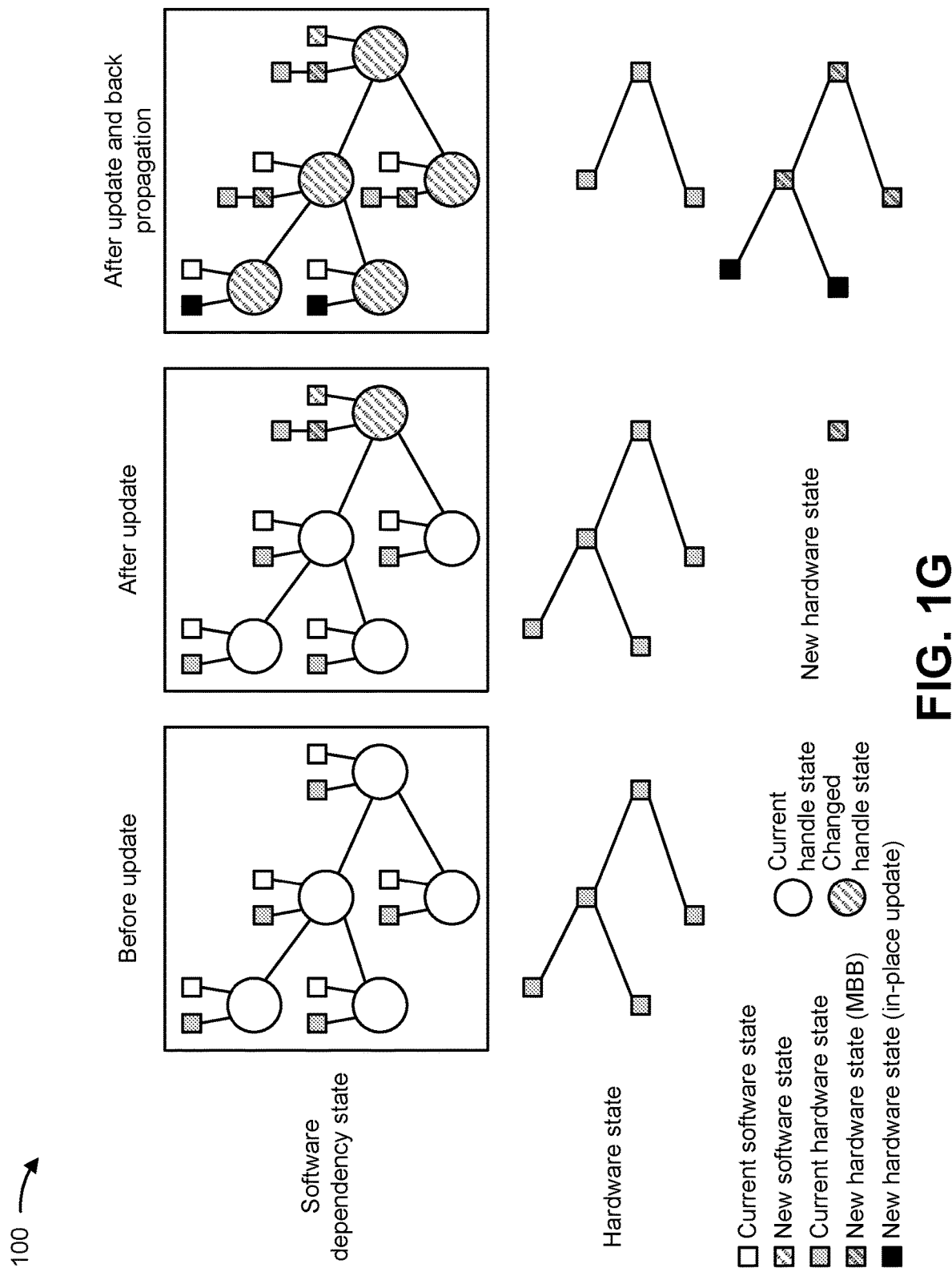

FIG. 1G depicts an example of an MBB update for the network device (e.g., via the configuration update). As shown, before the configuration update, the dependency graph shown to the left may include multiple nodes or entries (e.g., the unshaded circles) associated with a current software state (e.g., the unshaded squares) and a current hardware state (e.g., the shaded squares). Before the configuration update, the current hardware state may also be represented by a dependency graph. As further shown in FIG. 1G, after the configuration update, the updated dependency graph shown in the middle may include a node or entry (e.g., the cross-hatched circle) associated with a new software state (e.g., the cross-hatched and unshaded square) and a new MBB hardware state (e.g., the cross-hatched and shaded square). The updated dependency graph may also include multiple nodes or entries (e.g., the unshaded circles) associated with the current software state (e.g., the unshaded squares) and the current hardware state (e.g., the shaded squares). After the configuration update, the new hardware state may also be represented by a dependency graph depicting the new MBB hardware state.

As further shown in FIG. 1G, after the configuration update and backpropagation, the updated dependency graph shown to the right may include multiple nodes or entries (e.g., the cross-hatched circles) associated with the new software state (e.g., the cross-hatched and unshaded square), the new MBB hardware state (e.g., the cross-hatched and shaded squares), and a new in-place hardware state (e.g., the black squares). The updated dependency graph may also include multiple nodes or entries (e.g., the cross-hatched circles) associated with the current software state (e.g., the unshaded squares) and the current hardware state (e.g., the shaded squares). After the configuration update, the new hardware state may also be represented by a dependency graph depicting the new MBB hardware state and the new in-place hardware state.

Figure 1H:
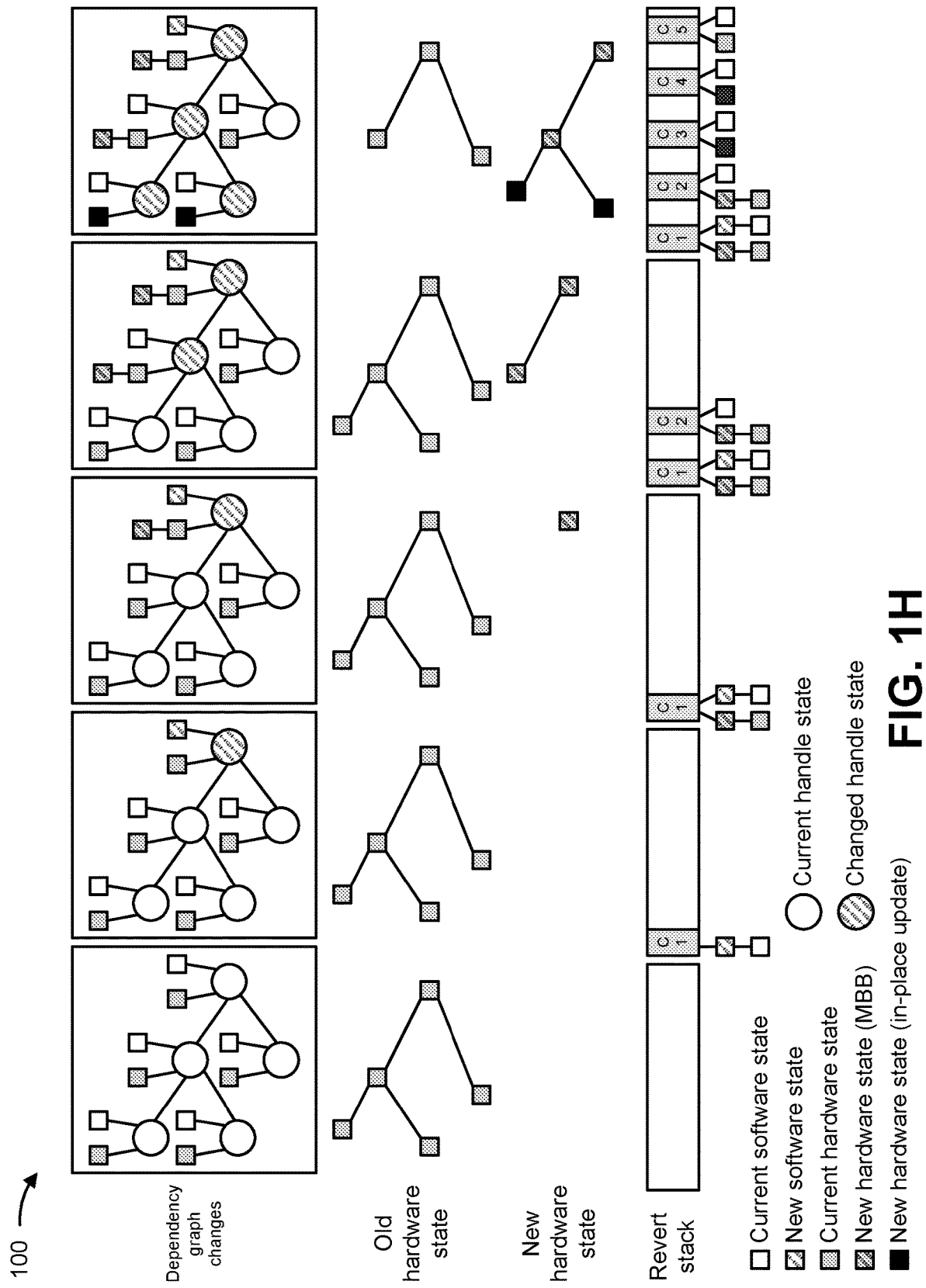

FIG. 1H depicts an example of an MBB update and backpropagation for the network device (e.g., via the configuration update). As shown, before the configuration update, the dependency graph shown first from the left may include multiple nodes or entries (e.g., the unshaded circles) associated with a current software state (e.g., the unshaded squares) and a current hardware state (e.g., the shaded squares). Before the configuration update, the old hardware state may also be represented by a dependency graph. The network device may also track a new hardware state of the dependency graph and may maintain a revert stack to track changes in the dependency graph. In the example of FIG. 1H, the configuration change may include five changes (e.g., labeled C1 through C5).

As further shown in FIG. 1H, after the first change of the configuration update, the updated dependency graph shown second from the left may include a node or entry (e.g., the cross-hatched circle) associated with a new software state (e.g., the cross-hatched and unshaded square). The updated dependency graph may also include multiple nodes or entries (e.g., the unshaded circles) associated with the current software state (e.g., the unshaded squares) and the current hardware state (e.g., the shaded squares). After the first change of the configuration update and backpropagation, the updated dependency graph shown third from the left may include the node or entry (e.g., the cross-hatched circle) associated with the new software state (e.g., the cross-hatched and unshaded square) and a new MBB hardware state (e.g., the cross-hatched and shaded square). The updated dependency graph may also include multiple nodes or entries (e.g., the unshaded circles) associated with the current software state (e.g., the unshaded squares) and the current hardware state (e.g., the shaded squares). After the first change of the configuration update and backpropagation, the new hardware state may also be represented by a dependency graph depicting the new MBB hardware state.

As further shown in FIG. 1H, after the first and second changes of the configuration update and backpropagation, the updated dependency graph shown fourth from the left may include nodes or entries (e.g., the cross-hatched circles) associated with the new software state (e.g., the cross-hatched and unshaded square) and the new MBB hardware state (e.g., the cross-hatched and shaded squares). The updated dependency graph may also include multiple nodes or entries (e.g., the unshaded circles) associated with the current software state (e.g., the unshaded squares) and the current hardware state (e.g., the shaded squares). After the first and second changes of the configuration update and backpropagation, the new hardware state may also be represented by a dependency graph depicting the new MBB hardware state (e.g., the cross-hatched and shaded squares).

As further shown in FIG. 1H, after the five changes of the configuration update and backpropagation, the updated dependency graph shown fifth from the left may include nodes or entries (e.g., the cross-hatched circles) associated with the new software state (e.g., the cross-hatched and unshaded square), the new MBB hardware state (e.g., the cross-hatched and shaded squares), and the new in-place hardware state (e.g., the black squares). The updated dependency graph may also include a node or entry (e.g., the unshaded circle) associated with the current software state (e.g., the unshaded squares) and the current hardware state (e.g., the shaded squares). After the five changes of the configuration update and backpropagation, the new hardware state may also be represented by a dependency graph depicting the new MBB hardware state (e.g., the cross-hatched and shaded squares) and the new in-place hardware state (e.g., the black squares).

Figure 1I:
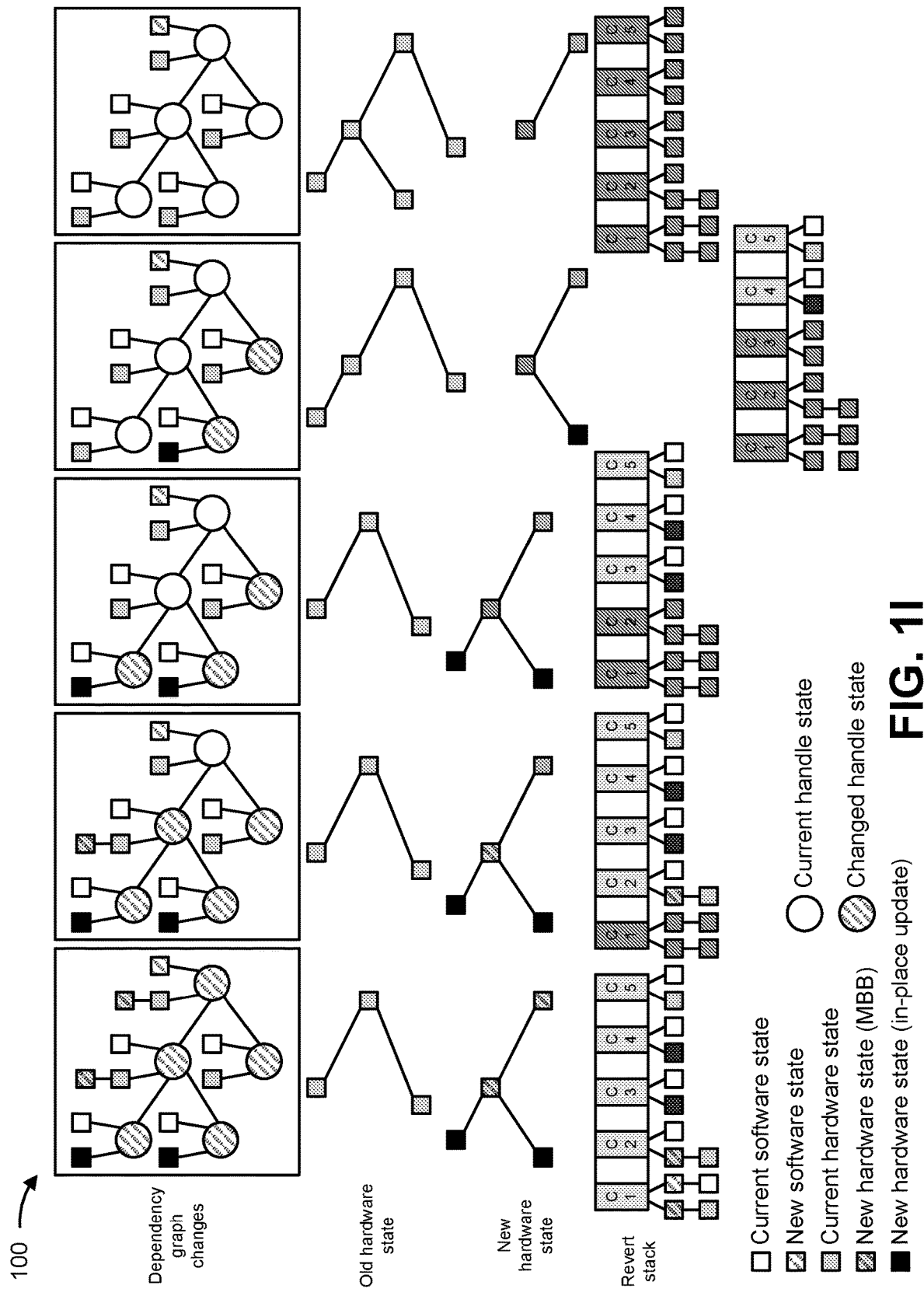

FIG. 1I depicts performing a rollback based on the revert stack generated during implementation of the five changes of the configuration update and backpropagation, as described above in connection with FIG. 1H. The updated dependency graph shown first from the left of FIG. 1I may be the same as the updated dependency graph shown the fifth from the left in FIG. 1H. The network device may utilize the revert stack to trace through the changes of the configuration update and to revert the changes back to an original state, which may generate the original configuration. The network device may revert the first change of the configuration update to generate the dependency graph shown second from the left of FIG. 1I, and may mark completion of the first change in the revert stack. Reversion of the first change may cause the dependency graph to include a node or entry (e.g., the unshaded circle) associated with the new software state (e.g., the cross-hatched and unshaded square) and the current hardware state (e.g., the shaded square).

The network device may revert the second change of the configuration update to generate the dependency graph shown third from the left of FIG. 1I, and may mark completion of the second change in the revert stack. Reversion of the second change may cause the dependency graph to include another node or entry (e.g., the unshaded circle) associated with the current software state (e.g., the unshaded square) and the current hardware state (e.g., the shaded square). The network device may revert the third change of the configuration update to generate the dependency graph shown fourth from the left of FIG. 1I, and may mark completion of the third change in the revert stack. Reversion of the third change may cause the dependency graph to include another node or entry (e.g., the unshaded circle) associated with the current software state (e.g., the unshaded square) and the current hardware state (e.g., the shaded square).

The network device may revert the fourth and fifth changes of the configuration update to generate the dependency graph shown fifth from the left of FIG. 1I, and may mark completion of the fourth and fifth changes in the revert stack. Reversion of the fourth and fifth changes may cause the dependency graph to include additional nodes or entries (e.g., the unshaded circles) associated with the current software state (e.g., the unshaded squares) and the current hardware state (e.g., the shaded squares). After reversion of the changes of the configuration update, the original configuration may be reinstated in the network device.

In this way, the network device provides rollback-on-error support for forwarding components of the network device. For example, the network device may provide a methodology to revert a configuration of the network device to an original state when a configuration update error occurs. The network device may test the configuration update and may determine whether a configuration update error occurs based on testing the configuration update. If a configuration update error occurs, the network device may rollback the configuration of the network device to an original state prior to the configuration update. Thus, the network device conserves computing resources, networking resources, and/or the like that would otherwise have been consumed based on creating an inconsistent state in the network device, handling lost traffic due the inconsistent state in the network device, exhausting resources of the network device for context specific or application specific techniques to correct the configuration update error, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
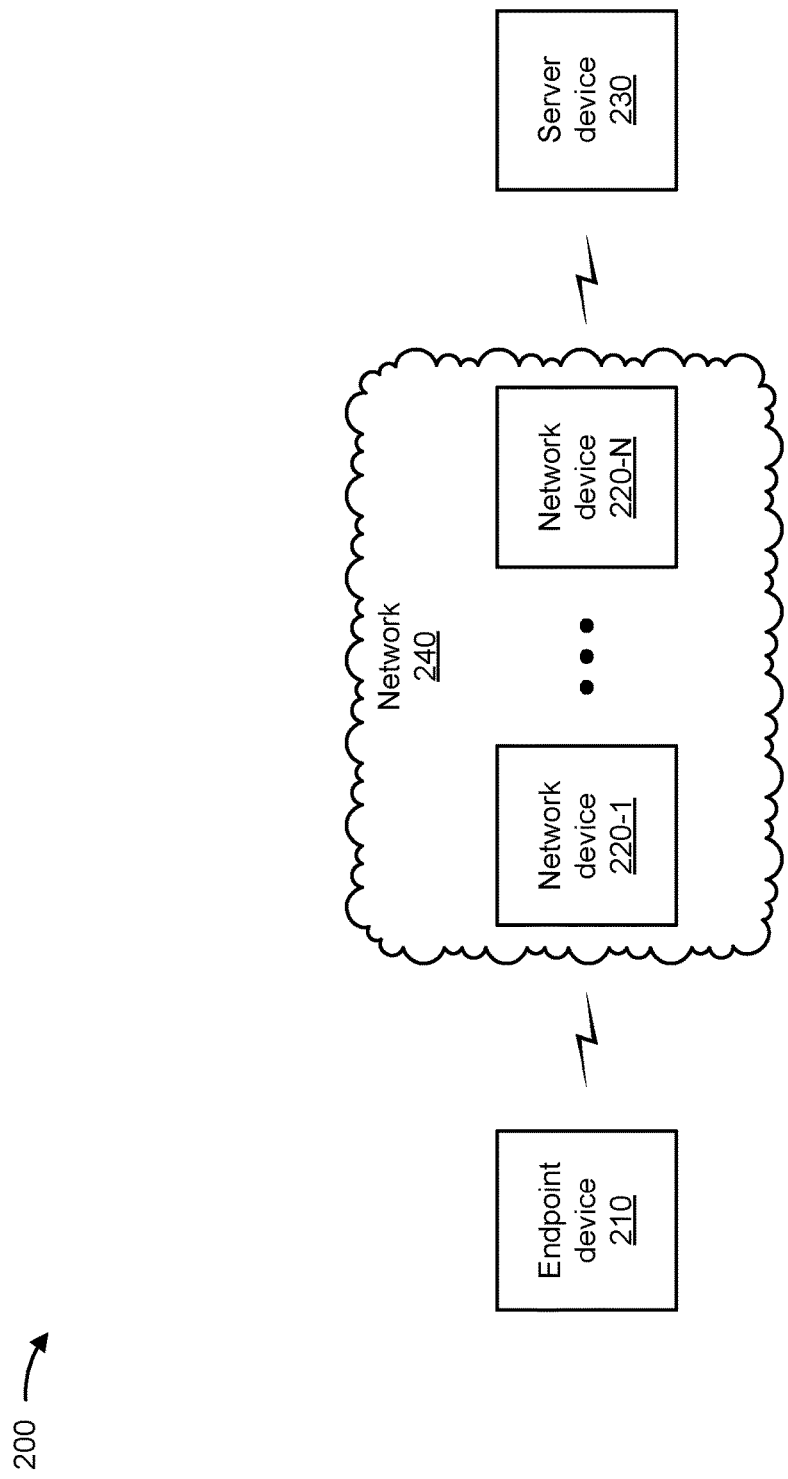
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
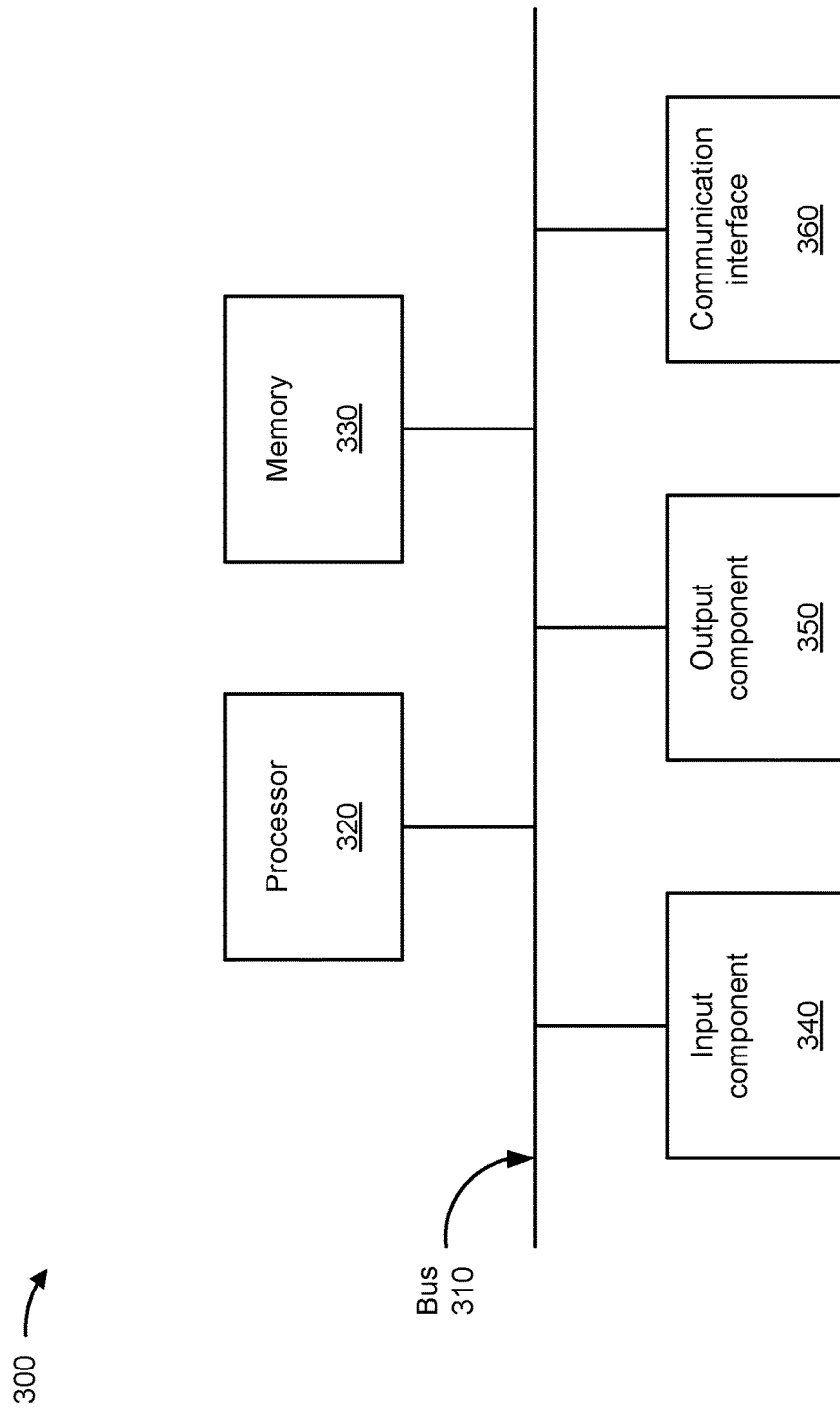
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
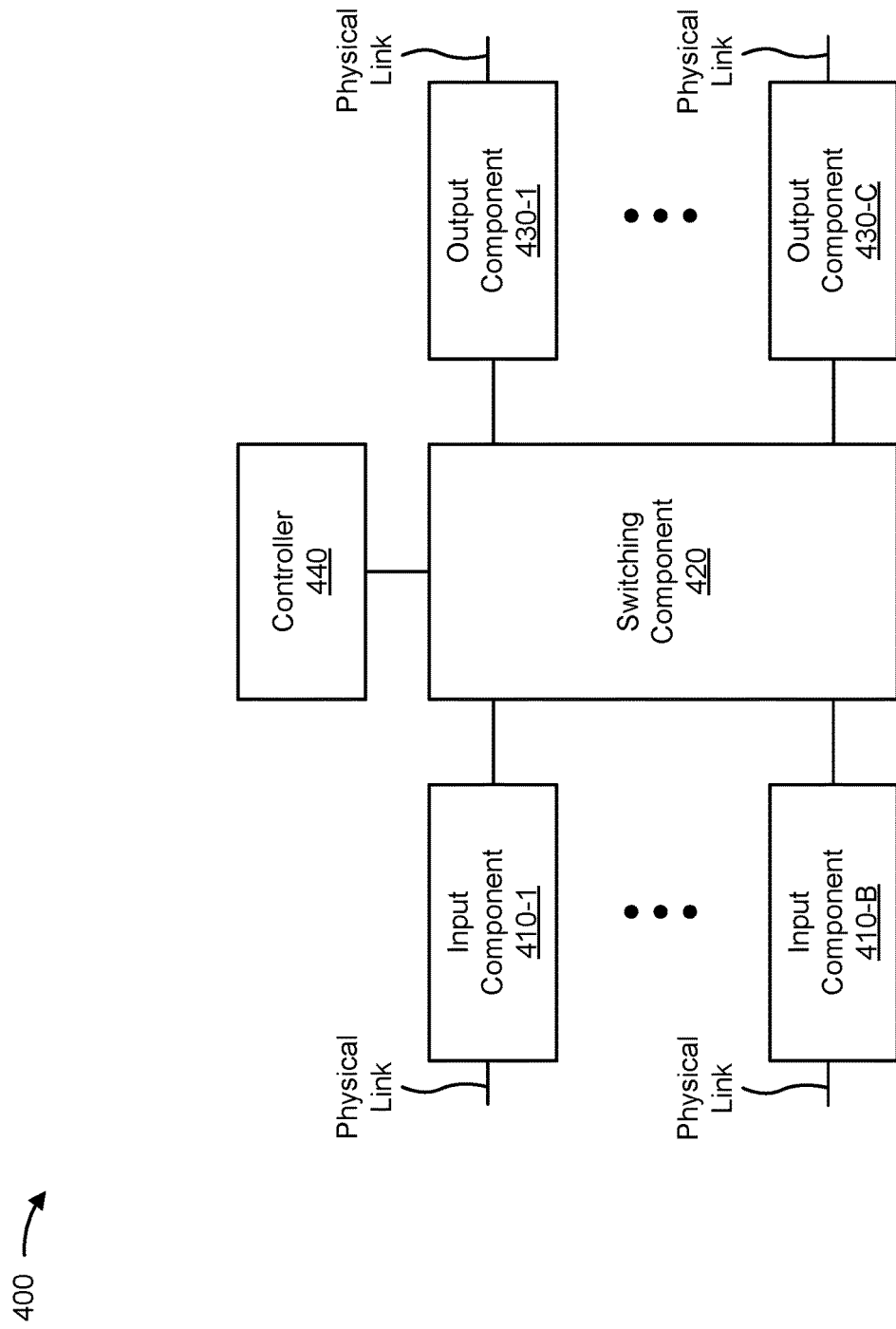

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
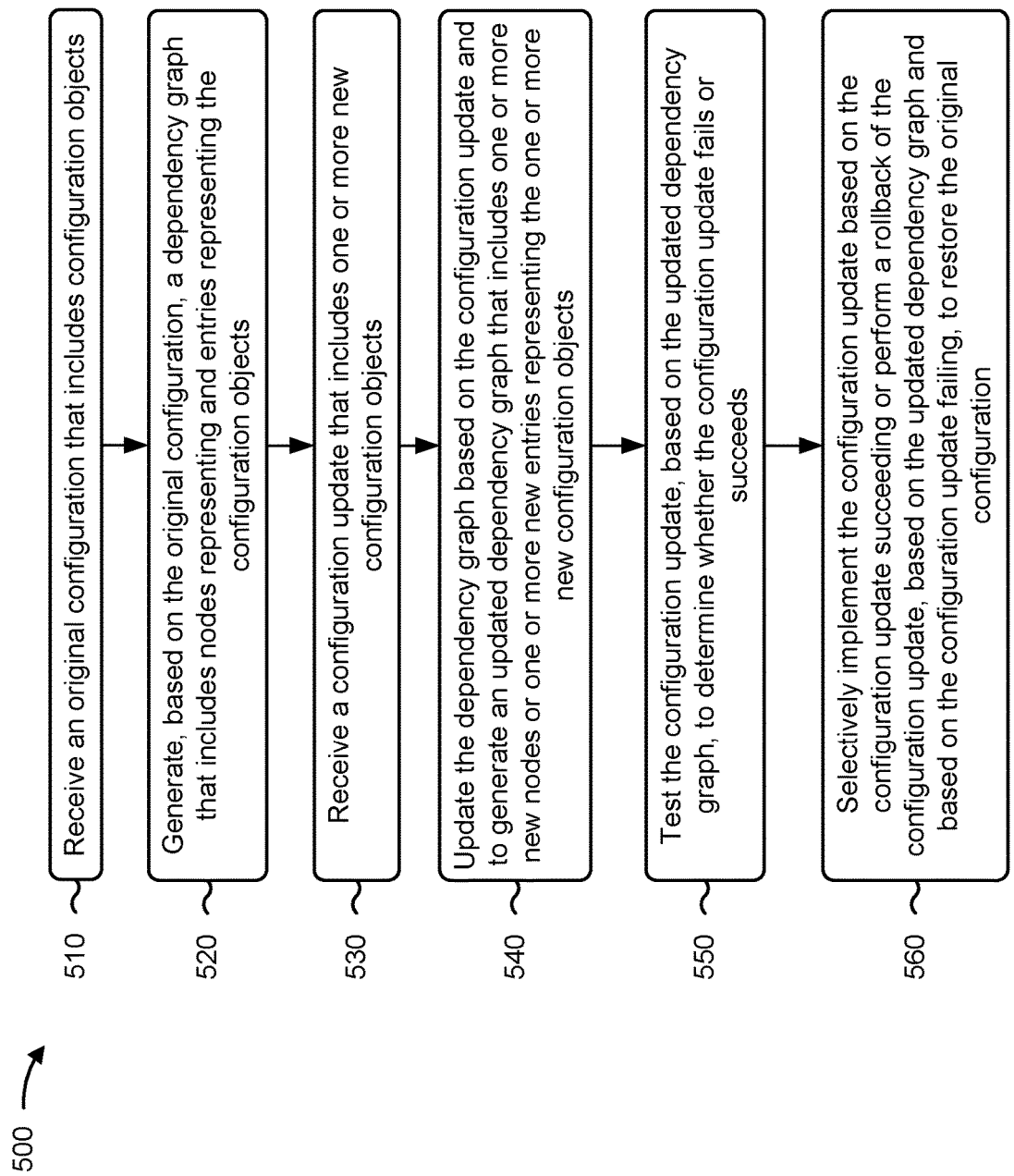
FIG. 5 is a flowchart of an example process for rollback-on-error support for forwarding components of a network device.

FIG. 5 is a flowchart of an example process 500 for providing rollback-on-error support for forwarding components of a network device. In some implementations, one or more process blocks of FIG. 5 may be performed by a network device (e.g., the network device 220). In some implementations, one or more process blocks of FIG. 5 may be performed by another device or a group of devices separate from or including the network device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, THE switching component 420, the output component 430, and/or the controller 440.

As shown in FIG. 5, process 500 may include receiving an original configuration that includes configuration objects (block 510). For example, the network device may receive an original configuration that includes configuration objects, as described above.

As further shown in FIG. 5, process 500 may include generating, based on the original configuration, a dependency graph that includes nodes and entries representing the configuration objects (block 520). For example, the network device may generate, based on the original configuration, a dependency graph that includes nodes and entries representing the configuration objects, as described above. In some implementations, the dependency graph is a representation of a packet topology.

As further shown in FIG. 5, process 500 may include receiving a configuration update that includes one or more new configuration objects (block 530). For example, the network device may receive a configuration update that includes one or more new configuration objects, as described above. In some implementations, the original configuration and the configuration update are associated with a packet forwarding component of the network device. In some implementations, the configuration update is one of an in-place update or a make-before-break update.

As further shown in FIG. 5, process 500 may include updating the dependency graph based on the configuration update and to generate an updated dependency graph that includes one or more new nodes or one or more new entries representing the one or more new configuration objects (block 540). For example, the network device may update the dependency graph based on the configuration update and to generate an updated dependency graph that includes one or more new nodes or one or more new entries representing the one or more new configuration objects, as described above.

In some implementations, updating the dependency graph based on the configuration update includes updating a software dependency state of the dependency graph based on the configuration update, and updating a hardware state of the dependency graph based on the configuration update to generate the updated dependency graph. In some implementations, updating the dependency graph based on the configuration update includes updating a software dependency state of the dependency graph based on the configuration update and to generate an updated software dependency state, updating a hardware state of the dependency graph based on the configuration update and to generate an updated hardware dependency state, and backpropagating the updated software dependency state and the updated hardware dependency state in the dependency graph to generate the updated dependency graph.

As further shown in FIG. 5, process 500 may include testing the configuration update, based on the updated dependency graph, to determine whether the configuration update fails or succeeds (block 550). For example, the network device may test the configuration update, based on the updated dependency graph, to determine whether the configuration update fails or succeeds, as described above.

As further shown in FIG. 5, process 500 may include selectively implementing the configuration update based on the configuration update succeeding, or performing a rollback of the configuration update, based on the updated dependency graph and based on the configuration update failing, to restore the original configuration (block 560). For example, the network device may selectively implement the configuration update based on the configuration update succeeding, or perform a rollback of the configuration update, based on the updated dependency graph and based on the configuration update failing, to restore the original configuration, as described above. In some implementations, implementing the configuration update includes implementing the configuration update in a packet forwarding component of the network device. In some implementations, performing the rollback of the configuration update includes identifying, in one of the one or more new nodes or one of the one or more new entries of the updated dependency graph, an error that generates an invalid software state, and reverting a software state of the updated dependency graph to an original state and to restore the original configuration. In some implementations, performing the rollback of the configuration update includes identifying, in one of the one or more new nodes or one of the one or more new entries of the updated dependency graph, an error that generates an invalid hardware state, and reverting a hardware state of the updated dependency graph to an original state and to restore the original configuration.

In some implementations, performing the rollback of the configuration update includes identifying, in the one or more new nodes or the one or more new entries of the updated dependency graph, multiple errors that generate an invalid hardware state, reverting the one or more new nodes or the one or more new entries of the updated dependency graph associated with the multiple errors, recording, in a revert stack, the reverting of the one or more new nodes or the one or more new entries of the updated dependency graph associated with the multiple errors, and reverting, based on the revert stack, a hardware state of the updated dependency graph to an original state and to restore the original configuration. In some implementations, performing the rollback of the configuration update includes identifying an error in one of the one or more new nodes of the updated dependency graph, creating a place holder node for the one of the one or more new nodes, releasing resources allocated to the one of the one or more new nodes, and reverting the updated dependency graph to restore the original configuration based on creating the place holder node and based on releasing the resources allocated to the one of the one or more new nodes.

In some implementations, process 500 includes identifying a configuration update error based on testing the configuration update, and determining that the configuration update fails based on identifying the configuration update error. In some implementations, process 500 includes identifying no configuration update error based on testing the configuration update, and determining that the configuration update succeeds based on identifying no configuration update error.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, an original configuration that includes configuration objects;
   generating, by the network device and based on the original configuration, a dependency graph that includes nodes and entries representing the configuration objects;
   receiving, by the network device, a configuration update that includes one or more new configuration objects;
   updating, by the network device, the dependency graph based on the configuration update and to generate an updated dependency graph that includes one or more new nodes or one or more new entries representing the one or more new configuration objects;
   testing, by the network device, the configuration update, based on the updated dependency graph, to determine whether the configuration update fails or succeeds; and
   selectively:
     implementing, by the network device, the configuration update based on the configuration update succeeding, or
     performing, by the network device, a rollback of the configuration update, based on the updated dependency graph and based on the configuration update failing, to restore the original configuration.

2. The method of claim 1, further comprising:
   identifying a configuration update error based on testing the configuration update; and
   determining that the configuration update fails based on identifying the configuration update error.

3. The method of claim 1, further comprising:
   identifying no configuration update error based on testing the configuration update; and
   determining that the configuration update succeeds based on identifying no configuration update error.

4. The method of claim 1, wherein the dependency graph is a representation of a packet topology.

5. The method of claim 1, wherein updating the dependency graph based on the configuration update comprises:
   updating a software dependency state of the dependency graph based on the configuration update; and
   updating a hardware state of the dependency graph based on the configuration update to generate the updated dependency graph.

6. The method of claim 1, wherein updating the dependency graph based on the configuration update comprises:
   updating a software dependency state of the dependency graph based on the configuration update and to generate an updated software dependency state;
   updating a hardware state of the dependency graph based on the configuration update and to generate an updated hardware dependency state; and
   backpropagating the updated software dependency state and the updated hardware dependency state in the dependency graph to generate the updated dependency graph.

7. The method of claim 1, wherein performing the rollback of the configuration update comprises:
   identifying, in one of the one or more new nodes or one of the one or more new entries of the updated dependency graph, an error that generates an invalid software state; and
   reverting a software state of the updated dependency graph to an original state and to restore the original configuration.

8. A network device, comprising:
   one or more memories; and
   one or more processors, coupled to the one or more memories, to:
     receive an original configuration that includes configuration objects;
     generate, based on the original configuration, a dependency graph that includes nodes and entries representing the configuration objects,
       wherein the dependency graph is a representation of a packet topology;
     receive a configuration update that includes one or more new configuration objects;
     update the dependency graph based on the configuration update and to generate an updated dependency graph that includes one or more new nodes and one or more new entries representing the one or more new configuration objects;
     test the configuration update, based on the updated dependency graph, to determine whether the configuration update fails or succeeds; and
     selectively:
       implement the configuration update based on the configuration update succeeding, or
       perform a rollback of the configuration update, based on the updated dependency graph and based on the configuration update failing, to restore the original configuration.

9. The network device of claim 8, wherein the one or more processors, to perform the rollback of the configuration update, are to:
- identify, in one of the one or more new nodes or one of the one or more new entries of the updated dependency graph, an error that generates an invalid hardware state; and
- revert a hardware state of the updated dependency graph to an original state and to restore the original configuration.

10. The network device of claim 8, wherein the one or more processors, to perform the rollback of the configuration update, are to:
- identify, in the one or more new nodes or the one or more new entries of the updated dependency graph, multiple errors that generate an invalid hardware state;
- revert the one or more new nodes or the one or more new entries of the updated dependency graph associated with the multiple errors;
- record, in a revert stack, the reverting of the one or more new nodes or the one or more new entries of the updated dependency graph associated with the multiple errors; and
- revert, based on the revert stack, a hardware state of the updated dependency graph to an original state and to restore the original configuration.

11. The network device of claim 8, wherein the one or more processors, to perform the rollback of the configuration update, are to:
- identify an error in one of the one or more new nodes of the updated dependency graph;
- create a place holder node for the one of the one or more new nodes;
- release resources allocated to the one of the one or more new nodes; and
- revert the updated dependency graph to restore the original configuration based on creating the place holder node and based on releasing the resources allocated to the one of the one or more new nodes.

12. The network device of claim 8, wherein the original configuration and the configuration update are associated with a packet forwarding component of the network device.

13. The network device of claim 8, wherein the configuration update is one of an in-place update or a make-before-break update.

14. The network device of claim 8, wherein the one or more processors, to implement the configuration update, are configured to:
- implement the configuration update in a packet forwarding component of the network device.

15. A non-transitory computer-readable medium storing a set of instructions, the set of instructions comprising:
- one or more instructions that, when executed by one or more processors of a network device, cause the network device to:
  - receive an original configuration that includes configuration objects;
  - generate, based on the original configuration, a dependency graph that includes nodes representing and entries representing the configuration objects;
  - receive a configuration update that includes one or more new configuration objects,
    - wherein the original configuration and the configuration update are associated with a packet forwarding component of the network device;
  - update the dependency graph based on the configuration update and to generate an updated dependency graph that includes one or more new nodes or one or more new entries representing the one or more new configuration objects;
  - test the configuration update, based on the updated dependency graph, to determine whether the configuration update fails or succeeds; and
  - selectively:
    - implement the configuration update based on the configuration update succeeding, or
    - perform a rollback of the configuration update, based on the updated dependency graph and based on the configuration update failing, to restore the original configuration.

16. The non-transitory computer-readable medium of claim 15, wherein the one or more instructions further cause the network device to:
- identify a configuration update error based on testing the configuration update; and
- determine that the configuration update fails based on identifying the configuration update error.

17. The non-transitory computer-readable medium of claim 15, wherein the one or more instructions further cause the network device to:
- identify no configuration update error based on testing the configuration update; and
- determine that the configuration update succeeds based on identifying no configuration update error.

18. The non-transitory computer-readable medium of claim 15, wherein the one or more instructions, that cause the network device to update the dependency graph based on the configuration update, cause the network device to:
- update a software dependency state of the dependency graph based on the configuration update; and
- update a hardware state of the dependency graph based on the configuration update to generate the updated dependency graph.

19. The non-transitory computer-readable medium of claim 15, wherein the one or more instructions, that cause the network device to update the dependency graph based on the configuration update, cause the network device to:
- update a software dependency state of the dependency graph based on the configuration update and to generate an updated software dependency state;
- update a hardware state of the dependency graph based on the configuration update and to generate an updated hardware dependency state; and
- backpropagate the updated software dependency state and the updated hardware dependency state in the dependency graph to generate the updated dependency graph.

20. The non-transitory computer-readable medium of claim 15, wherein the one or more instructions, that cause the network device to perform the rollback of the configuration update, cause the network device to:
- identify, in one of the one or more new nodes or one of the one or more new entries of the updated dependency graph, an error that generates an invalid software state; and
- revert a software state of the updated dependency graph to an original state and to restore the original configuration.

* * * * *